Figure 3:
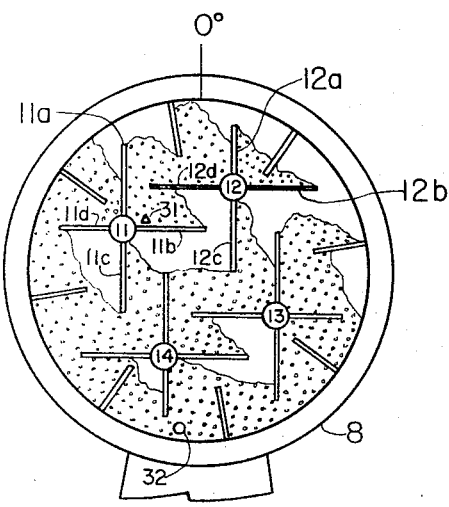

March 14, 1967  V. F. KAUFMAN ET AL  3,308,552
FREEZE-DRYING APPARATUS
Filed July 30, 1964  2 Sheets-Sheet 1
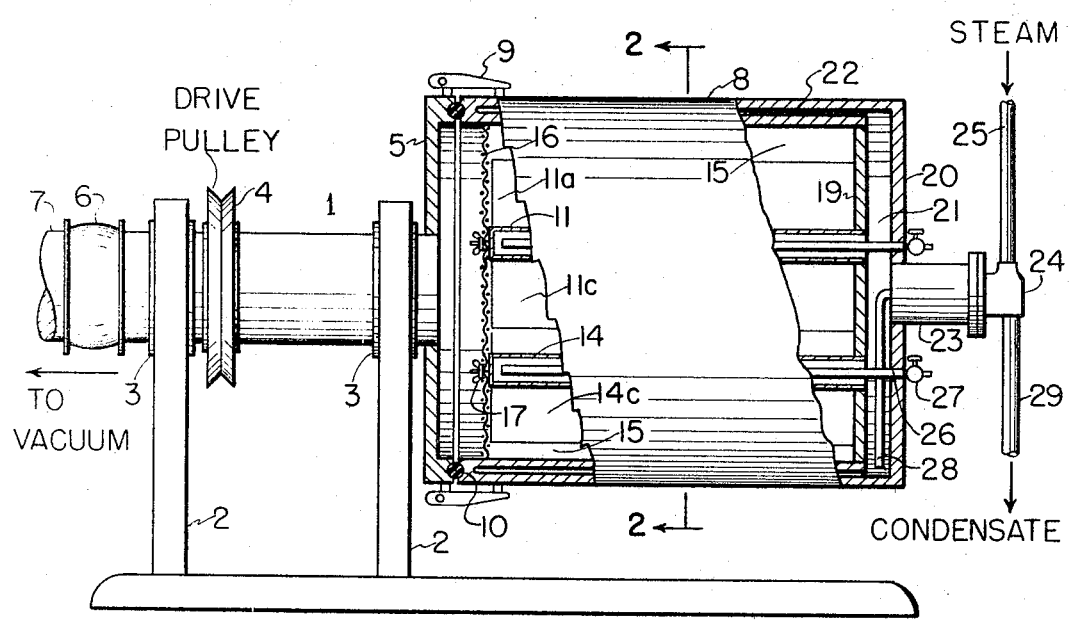
FIG. 1
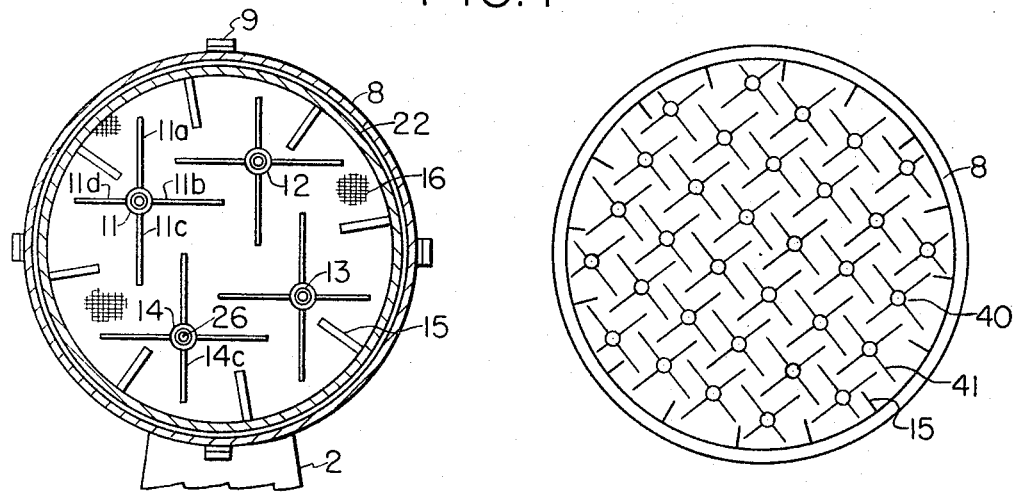
FIG. 2
FIG. 7
V.F. KAUFMAN & W.C. ROCKWELL
INVENTORS
BY R. Hoffman
ATTORNEY … # 3,308,552
FREEZE-DRYING APPARATUS
Vern F. Kaufman, Lafayette, and William C. Rockwell, El Cerrito, Calif., assignors to the United States of America as represented by the Secretary of Agriculture
Filed July 30, 1964, Ser. No. 386,465
4 Claims. (Cl. 34—92)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its objects the provision of novel apparatus for conducting freeze-drying. Other objects of the invention will be evident from the following description.

In the annexed drawing, FIG. 1 is a side view of the device of the invention, portions of the structure being cut away for clarity of comprehension. FIGURE 2 is a cross-section on plane 2—2 of FIG. 1. FIGURES 3, 4, 5 and 6 are schematic diagrams illustrating the distribution of material in the drying chamber and the mode by which individual particles move as the drying chamber is rotated through 360°. FIGURE 7 is a schematic diagram illustrating a different modification of the invention.

The dehydration procedure generally designated as freeze-drying involves the following basic technique: The material to be treated is frozen and while in such frozen state is subjected to vacuum. Under these conditions, the ice in the material sublimes, that is, it is transformed directly into water vapor. The evolved water vapor is removed by the vacuum system whereby the sublimation process continues until the material is dehydrated. Since the process of sublimation causes an absorption of heat, the temperature of the material would ordinarily decrease to such a low level that the rate of sublimation would be too low for practical purposes. Accordingly, it is conventional to apply heat during the process to supply the heat of sublimation.

Generally, freeze-drying is conducted by a batch technique utilizing a conventional vacuum drier of the shelf type. Such driers include a sturdy cabinet provided with a door which may be sealed to a vacuum-tight condition. Within the cabinet are a series of hollow shelves through which a suitable heating medium such as steam or hot water may be circulated. In operation, the material to be dehydrated, for example, peas, strawberries, chicken pieces, etc., are placed on trays and frozen. The trays of frozen material are then slid onto the shelves of the drier, the door closed, and the interior of the cabinet evacuated. Heat is applied to the hollow shelves and the system is maintained under the appropriate conditions of vacuum and applied heat until the product is dehydrated. The freeze-drying procedure has certain advantages which render it desirable for dehydration of foods. Notable among these is that the products retain their original size and shape and have a porous texture so that they can be readily rehydrated. Another item is that there is a marked reduction in damage to such properties as flavor and color as compared with air-drying procedures.

Although the freeze-drying technique involves certain advantages, it is also subject to certain disadvantages. A primary area of concern is the slowness of the process. For example, dehydrating a batch of peas by freeze-drying will take anywhere from 2½ to 6 times as long as dehydrating the same produce in a current of hot air. Another problem is non-uniformity of dehydration. In the conventional shelf-type drier the material adjacent to the heated shelves loses moisture at a much faster rate than material which is isolated from the shelf, for instance, by a layer of the material under treatment. As a result, some portions of the product will be properly dehydrated (or even over-dehydrated or heat-damaged) while other portions of the product will be inadequately dehydrated and may even contain ice in the centers of the pieces of material.

The device of the present invention obviates these disadvantages of the known procedures and apparatus. Some of the particular advantages of the device of the invention are listed below:

(1) The material is dehydrated uniformly. There are no areas of under- or over-dehydration in the product.

(2) The material is handled gently—there is no exposure to undue mechanical stresses—so that the pieces of material retain their size and shape.

(3) A heated surface is provided and all surfaces of the material are contacted therewith by applying a tumbling action to the pieces of material. As a result, the dehydration is effected efficiently, i.e., water is removed from the material at a very rapid rate, yet without damage to the properties of the material.

(4) The device is compact; it has a much greater capacity than conventional shelf-type driers.

(5) Space within the drying chamber is utilized efficiently by providing means to distribute material from top to bottom of the chamber.

(6) Heat-transmitting fins and baffles are provided, which are utilized efficiently by contacting material to be dried with both sides of these heat-transferring members.

The apparatus of the invention is described in detail below, having reference to the annexed drawing:

Shaft 1, of hollow construction, extends through supports 2 and is journaled in bearings 3. On shaft 1 is keyed pulley 4 by which the shaft and associated mechanisms are rotated. Generally, the device is rotated at a slow speed, for example, about 0.1 r.p.m. to 1.0 r.p.m.

At its right-hand end, shaft 1 is connected to a circular flanged head 5. At the opposite end, shaft 1 is connected through a conventional ball joint 6 to a stationary pipe 7 which leads to a source of vacuum such as a conventional steam ejector whereby the interior of the drier is continuously maintained under vacuum.

The material being dried is maintained in cylindrical chamber 8, detachably mounted on head 5 by latches 9. A rubber O-ring 10 is provided to maintain a vacuum-tight seal between the edges of head 5 and chamber 8. As evident from FIG. 1, drying chamber 8 is rotated by shaft 1 and is in communication through the hollow center of this shaft with vacuum line 7.

Within drying chamber 8 are mounted tubes 11, 12, 13 and 14, each provided with four fins 11a, 11b, 11c, 11d, 12a, etc., made of copper or other metal of high thermal conductivity. As shown in FIG. 1, these fins extend the full length of drying chamber 8. Viewed transversely, as depicted in FIG. 2, each set of fins forms a cross and the corresponding fins of one tube are parallel to those of every other tube. Projecting radially from the interior wall of drying chamber 8 are a series of baffles 15 made of copper or other metal of high thermal conductivity. Each of these baffles extends the full length of drying chamber 8.

To retain material within drying chamber 8, there is provided a detachable circular screen 16. This is held in place by wing-nuts 17, cooperative with threaded rods extending from the ends of tubes 11, 12, 13, and 14.

To provide heat, the following structure is used: The base of drying chamber 8 is formed of walls 19 and 20, the space therebetween defining a plenum chamber 21 communicating with the annular space 22 and with the interior of tubes 11, 12, 13, and 14. Pipe 23 fixed to end wall 20, is connected to rotary joint 24 which permits rotation of the drying chamber while appropriate steam and condensate lines remain stationary. Steam from supply line 25 flows through the joint 24 and pipe 23 into plenum chamber 21, from where it is distributed to the annular space 22 and to tubes 11, 12, 13, and 14. To prevent air-lock, each of the tubes 11, 12, 13, and 14 contains a conduit 26, open at its left-hand end and connected to a petcock 27 at the right-hand end. By opening these petcocks for a short time at the start of a run, air entrapped in the interior of tubes 11, 12, 13, and 14 is released. A similar petcock arrangement may be provided in the cylindrical wall of drying chamber 8 for release of air from annular space 22. Condensate which forms collects at the base of plenum chamber 21 and is blown out of the system via conduit 28, rotary joint 24, and discharge pipe 29.

In operating the device, steam and condensate lines 25 and 29 (preferably of flexible braided metal hose) are disconnected. Latches 9 are released and drying chamber 8 is deposited in a suitable cradle with its open end up. Wing-nuts 17 are unscrewed and screen 16 lifted out. The material to be dried—for example, frozen fresh peas—is then placed in chamber 8, filling it about ⅓ to ⅔ full. The screen is then replaced, secured, and the drying chamber again latched to head 5. Rotation of shaft 1 is initiated which, of course, rotates the chamber 8. The vacuum system is activated and when the drying chamber is exhausted, the steam lines and condensate lines are connected. Heat from the steam is transferred to the walls of the drying chamber, to tubes 11, 12, 13, and 14, to the fins extending from these tubes, and to baffles 15. Thus, as drying chamber 8 rotates, the material rolls from one heated surface to another with uniform exposure thereto. This exposure to uniform heat, plus concomitant exposure to the vacuum existing within chamber 8 causes a rapid and uniform sublimation of moisture from each particle of the material. The evolved vapors pass through screen 16 and through shaft 1 to the vacuum system connected to conduit 7. On completion of the drying, chamber 8 is detached from head 5, screen 16 is removed, and the dried product poured out.

A special feature of the invention lies in the arrangement of the fins 11a, 11b, 11c, etc. mounted on tubes 11, 12, 13 and 14, and of the baffles 15. These structures serve dual roles. The first is that they serve to transfer heat to the material being dried. Secondly, they act as the means to support the material and to direct the movement of the particles of material as the drying chamber rotates. Particularly important in this regard is that the fins and baffles are arranged to form a maze or labyrinth. Thus, there are very few straight-line paths more than about a half-radius long by which material might pass transversely from one portion of the chamber to another. Particles traveling any longer distance must take a very tortuous path. The net result of this arrangement is that the drying chamber is effective at high loadings—the material is distributed quite uniformly over the network of fins and baffles. This fact is evident from FIG. 3 which represents the distribution of material with chamber 8 about half-full. It is evident from this figure that there is essentially no waste space at the top of the chamber; the volume of material above the axis is substantially the same as the volume of material below the axis. It is thus evident that the fins and baffles cooperate to support the material so that the entire space in the drum is utilized. It is further evident that in the absence of the fins and baffles, the material would simply slump to the bottom of the drying chamber, whereby some particles would be close to the hot walls thereof and others remote, with the net result that dehydration would be slow and non-uniform.

Figure 4:
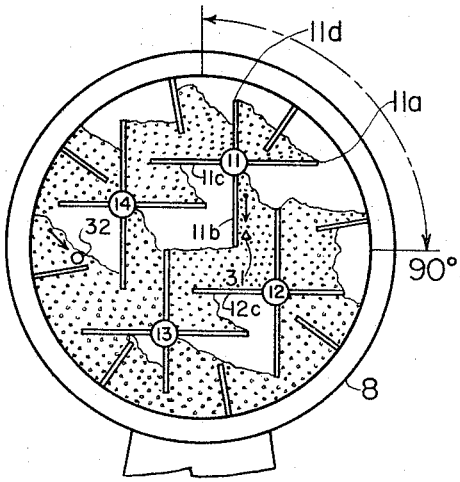
Figure 5:
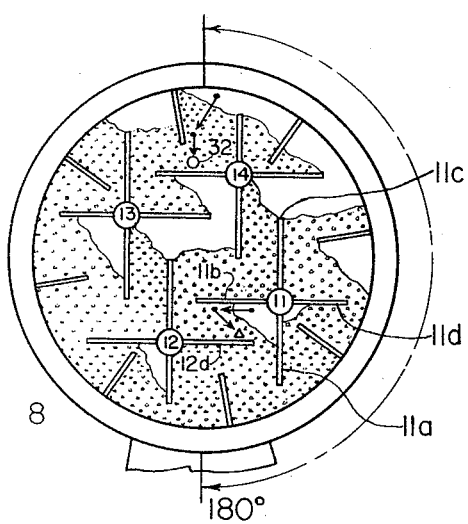
Figure 6:
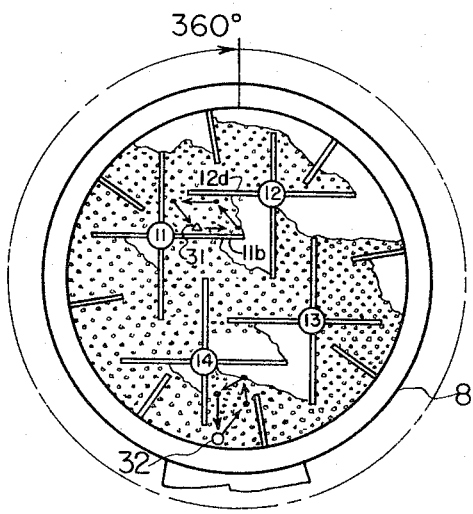

The fins and baffles function not only as supports, but also as guides to direct the particles in closed circuits within the small pockets formed by adjacent fins and/or baffles. In this regard, particular reference is made to FIGS. 3 to 6. FIGURE 3 represents the system in the initial state; FIG. 4 after rotation 90°; FIG. 5 after rotation 180°; and FIG. 6 after rotation 360°. Referring particularly to FIG. 3, triangle 31 represents an individual particle of material lying on fin 11b close to tube 11. As chamber 8 rotates 90°, particle 31 moves along fin 11b in the direction toward fin 12c, as evident in FIG. 4 (The original position of the particle is represented by a dot.) As the rotation continues to a total of 180°, particle 31 has moved in a new direction, this time obliquely toward fin 12d and fin 11a, as shown in FIG. 5. By the time a complete revolution has been made (FIG. 6), particle 31 has taken a new direction toward fin 11a and then a fourth new direction toward fin 11b and ended up in essentially its original position. As shown in FIG. 6, the net result is a circuit of the particle within the confines of the pocket defined by fins 11a, 11b, 12c, and 12d. FIGURES 3 to 6 disclose a similar movement of a particle 32 which circuits in a pocket adjacent the wall of chamber 8. It is evident that, in general, all the particles of material undergo similar movements with the net result that all surfaces of the particles are uniformly exposed to the heated surfaces of the fins and baffles whereby uniform dehydration at a rapid rate is ensured. A further feature of the circulation of the particles in the small pockets, cushioned as they are by adjacent particles, is that abrasive and other forces which might mechanically damage the particles are minimized. As a result, the particles of product retain the size and shape of the original particles; essentially no fines are produced. This is in sharp contrast with a system like that of a conventional rotary kiln wherein the particles freely shower from one part of the kiln to a diametrically opposite part, whereby a great deal of abrasion occurs and the edges of the particles are ground off, yielding much fine material which is of little commercial value.

To prevent sticking of the material to the drying equipment, it is preferred that the surfaces that come into contact with the material—particularly the heated surfaces such as the inside wall of chamber 8, the fins, and the baffles—be coated with a fluorocarbon resin such as polytetrafluoroethylene.

In the embodiment of the invention shown in the FIGS. 1 to 6, four tubes (11, 12, 13, 14) are shown. It is not critical that only four of these tubes be used. One can provide a much larger number and such is preferred, particularly where the diameter of chamber 8 is increased. This correlation of chamber diameter and number of tubes means that in any case the pockets within which circulation of material is restricted remain small and also means that proper support is supplied to keep the material adequately distributed from top to bottom of the chamber. It is, of course, obvious that the number of tubes corresponding to 11, 12, 13 and 14—whether there be four, eight, sixteen, or more thereof—are arranged in similar manner. This is demonstrated by FIG. 7 which schematically depicts a cylindrical drying chamber 8 containing a total of thirty-two tubes 40 arranged in parallel rows with their associated fins 41 and baffles 15, all functioning in the same manner as the corresponding structure in the modification of FIGS. 1 to 6.

The apparatus of the invention can be employed for the dehydration of any particulate material. Typical examples of such materials are peas; berries; grapes; diced fruits, vegetables, or meats, etc. As customary in freeze-drying procedures, these materials are first frozen, then applied to the device while in the frozen state. Also, because of the solidifying effect of freezing, the device may be used for dehydration of liquid materials such as milk; eggs; and juices, extracts, purees, or concentrates derived from fruits, vegetables, meats, or cereals. In such applications, the liquid raw material is frozen in the form of globules, pellets, tablets, dice or other appropriate particles and applied as such to the drier.

Although the device of the invention is particularly adapted for conducting freeze-drying, it is evident that it can be used for vacuum drying when the material being treated is not in a frozen state.

The described embodiments of the invention are designed for batch-type operation. However, if desired, the apparatus may be modified by addition of supply and discharge means equipped with vacuum locks for continuous feeding of raw material and continuous discharge of dried product whereby the drying can be conducted on a continuous basis.

In the described embodiments, four fins are shown in each assembly of tube and fins. It has also been found that assemblies each containing six fins give good results. Another item is that the heating of the various parts—i.e., fins 11a, 11b, 11c, 11d, 12a, 12b, 12c, 12d, etc., baffles 15, and the walls of chamber 8—need not necessarily be heated by the described systems. For example, these members may be similar to panel-type heaters in that tubes (through which a heating medium is circulated) may be embedded in these members or attached to the surface thereof.

The invention is further demonstrated by the following illustrative example:

The drier used in the run was as shown in FIGS. 1 and 2. Drying chamber 8 had internal dimensions: 15½" diameter, 12" long. Fins 11, 12, 13, and 14 were 12" long and 2¾" or 3½" wide. Baffles 15 were 12" long and 2" or 3" wide.

The starting material was frozen fresh peas, having a moisture content of 80%. Twenty-five pounds of this material was placed in drying chamber, filling it about half full. During the dehydration, the drying chamber was rotated at 0.4 r.p.m. and steam was introduced at 260° F. except during the last half-hour of the run when the steam temperature was tapered off to 212° F. The vacuum was maintained at 0.5 mm. Hg. In 4 hours the product was removed and found to have a moisture content of 3%. The product consisted of whole peas; there was no breakage of individual seeds or even removal of skins. Also, the peas were uniformly dehydrated; there were no moist centers. Taste tests indicated that there was no damage to flavor.

In a control run a batch of the same frozen fresh peas were dehydrated in a conventional vacuum shelf drier. It was found that it required 8 hours to dehydrate the product to a moisture content of 3% and yet 2% of the peas in the product still contained ice in their centers.

Having thus described our invention, we claim:

1. A drier adapted for freeze-drying of foods comprising, in combination, a vacuum-tight, cylindrical chamber mounted for rotation about its axis, means for rotating the chamber, means for heating the walls of the chamber, means for maintaining a vacuum within the chamber, and means for supporting, heating, and guiding material within the chamber as it rotates, said last-named means comprising a plurality of fin assemblies extending the length of the chamber and parallel to the axis thereof, each fin assembly having four separate and distinct fins arranged in cruciform pattern, heaters for conducting heat to said fins, and a plurality of baffles projecting inwardly from the wall of the chamber and extending the length thereof, said fins and baffles being proportioned to subdivide the interior of the chamber into a plurality of interconnecting pockets, the maximum transverse dimensions of each pocket being less than the internal radius of the chamber.

2. A drier adapted for freeze-drying of foods comprising, in combination, vacuum-tight, cylindrical chamber mounted for rotation about its axis, means for rotating the chamber, means for heating the chamber, means for maintaining a vacuum within the chamber, a plurality of fin assemblies extending the length of the chamber and parallel to the axis thereof, each assembly having four separate and distinct fins arranged in the form of a cross with the arms of one cross parallel to the corresponding arms of every other cross, means for heating said fins, a plurality of baffles projecting inwardly from the inner surface of the chamber and extending the length thereof, said fins and baffles cooperating to support material uniformly in the chamber and to define a plurality of labyrinthine passages within the chamber whereby to restrict straight-line movement of material and to direct material in circuitous paths as the chamber rotates.

3. A drier adapted for freeze-drying of foods comprising, in combination, a vacuum-tight, cylindrical chamber mounted for rotation about its axis, means for rotating the chamber, means for heating the walls of the chamber, means for maintaining a vacuum within the chamber, a plurality of tubes within the chamber, extending the length thereof and parallel to the axis thereof, means for heating said tubes, each tube bearing four separate and distinct fins of heat-conductive metal extending radially in the form of a cross with the arms of one cross parallel to the corresponding arms of every other cross, a plurality of baffles of heat-conductive metal projecting inwardly from the inner surface of the chamber and extending the length thereof, said fins and baffles cooperating to support material uniformly in the chamber and to define a plurality of labyrinthine passages within the chamber, whereby to restrict straight-line movement of material and to direct material in circuitous paths as the chamber rotates while concomitantly exposing the material to heat and vacuum.

4. A drier adapted for freeze-drying of foods comprising, in combination, a vacuum-tight, cylindrical chamber mounted for rotation about its axis, means for rotating the chamber, means for maintaining a vacuum within the chamber, a plurality of separate and distinct cruciform fin assemblies arranged in parallel rows and extending the length of the chamber, a plurality of baffles projecting radially inward from the walls of the chamber and extending the length thereof, said baffles and fin assemblies being proportioned to subdivide the interior of the chamber into a plurality of interconnecting pockets, the maximum transverse dimensions of each pocket being less than the internal radius of the chamber, and means for heating the baffles, fin assemblies, and walls of the chamber.

References Cited by the Examiner

UNITED STATES PATENTS

| | | | |
|---|---|---|---|
| 135,733 | 2/1873 | Slater | 34—179 |
| 1,160,109 | 11/1915 | Hennici | 34—108 |
| 1,920,800 | 8/1933 | McCausland | 165—183 X |
| 2,024,062 | 12/1935 | Preedit | 34—108 |
| 2,070,227 | 2/1937 | Essers | 34—136 |
| 2,185,930 | 1/1940 | Simpson et al. | 165—183 |
| 2,268,486 | 12/1941 | Huzenlaub | 34—92 |
| 2,347,487 | 4/1944 | Kirchmann | 34—92 |
| 3,208,512 | 9/1965 | Kalmbach | 165—88 |

MARTIN P. SCHWADRON, *Primary Examiner.*

FREDERICK L. MATTESON, JR., B. L. ADAMS,
*Assistant Examiners.*